(12) United States Patent
Khanna

(10) Patent No.: US 10,681,451 B1
(45) Date of Patent: Jun. 9, 2020

(54) ON-BODY DETECTION OF WEARABLE DEVICES

(71) Applicant: Amazon Technologies, Inc., Seattle, WA (US)

(72) Inventor: Varn Khanna, Vallejo, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/105,703

(22) Filed: Aug. 20, 2018

(51) Int. Cl.
*H04R 1/10* (2006.01)
*G06F 3/16* (2006.01)
*G06F 3/044* (2006.01)
*G06F 3/0346* (2013.01)

(52) U.S. Cl.
CPC ........... *H04R 1/1041* (2013.01); *G06F 3/165* (2013.01); *H04R 1/1016* (2013.01); *G06F 3/0346* (2013.01); *G06F 3/044* (2013.01); *H04R 2420/07* (2013.01)

(58) Field of Classification Search
CPC ................................................. H04R 1/1016; H04R 2420/07; H04R 1/1041; H04R 5/033; H04R 1/1008; H04R 2420/03; H04R 2201/109; H04R 2225/025; H04R 3/00; H04R 2201/10; H04R 2225/61; G06F 3/165; G06F 3/0346; G06F 3/044

USPC .... 381/7, 23.1, 301, 303–305, 309, 311, 55, 381/58, 314–315, 71.6, 74, 123
See application file for complete search history.

(56) References Cited

U.S. PATENT DOCUMENTS

2018/0124495 A1* 5/2018 Boesen ................. H04R 3/04
2019/0297408 A1* 9/2019 Mohammadi ........ H04R 1/1041

* cited by examiner

*Primary Examiner* — Norman Yu
(74) *Attorney, Agent, or Firm* — Pierce Atwood LLP

(57) ABSTRACT

A system and method for determining an in-ear status of a wearable audio device includes determining that the device is in motion by monitoring a first sensor (e.g., an accelerometer) and determining that an acceleration is greater than an acceleration threshold. Once motion is determined, a second sensor (e.g., a capacitive sensor) is activated; contact with a body is determined based on contact data from the second sensor (e.g., a capacitance being greater than a capacitance threshold). Once contact is determined, a third sensor (e.g., an infrared sensor) is activated; proximity to the body is determined based on infrared data from third sensor (e.g., infrared data being greater than an infrared threshold). Once proximity is determined, the device changes its status to in-ear.

20 Claims, 20 Drawing Sheets

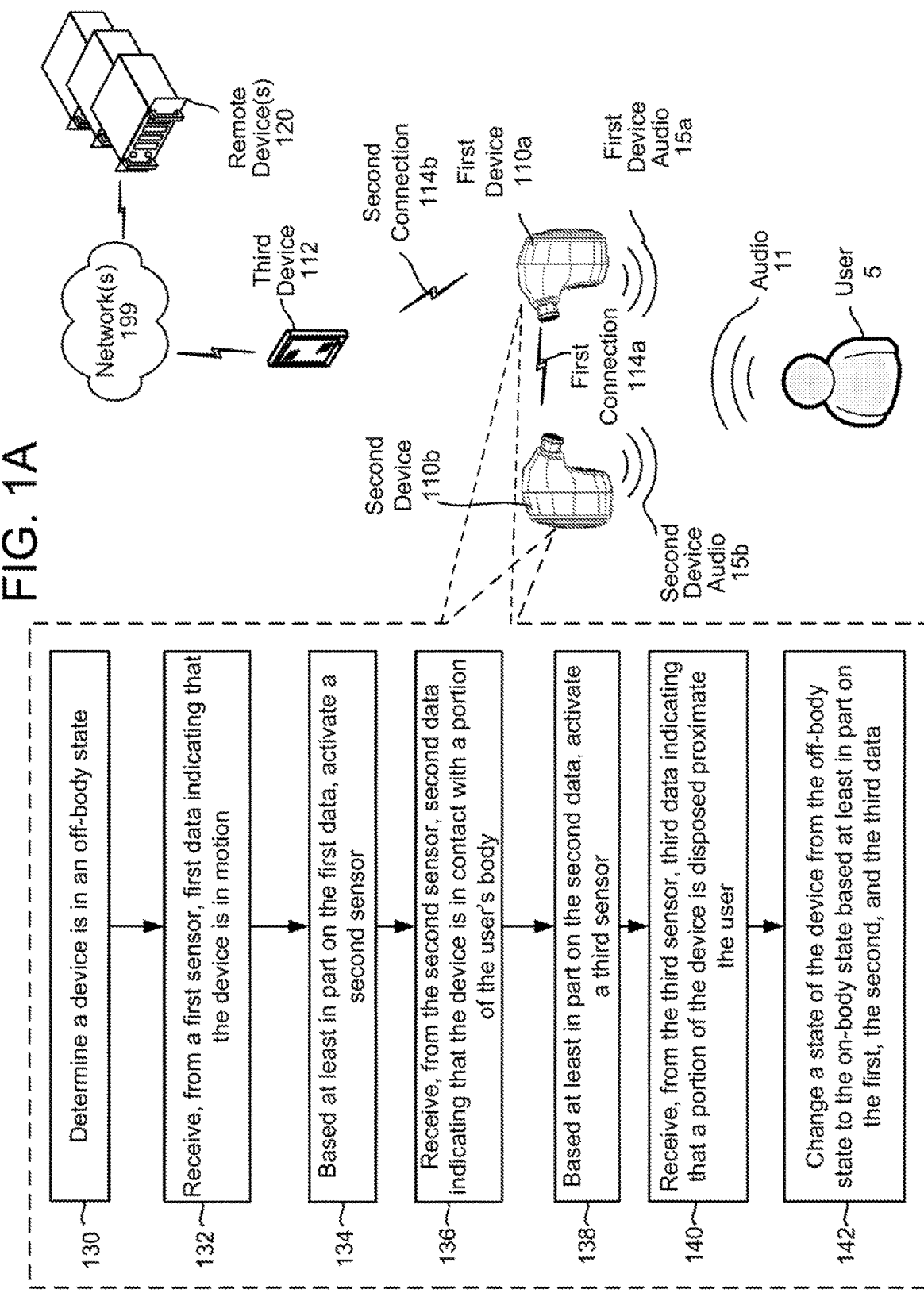

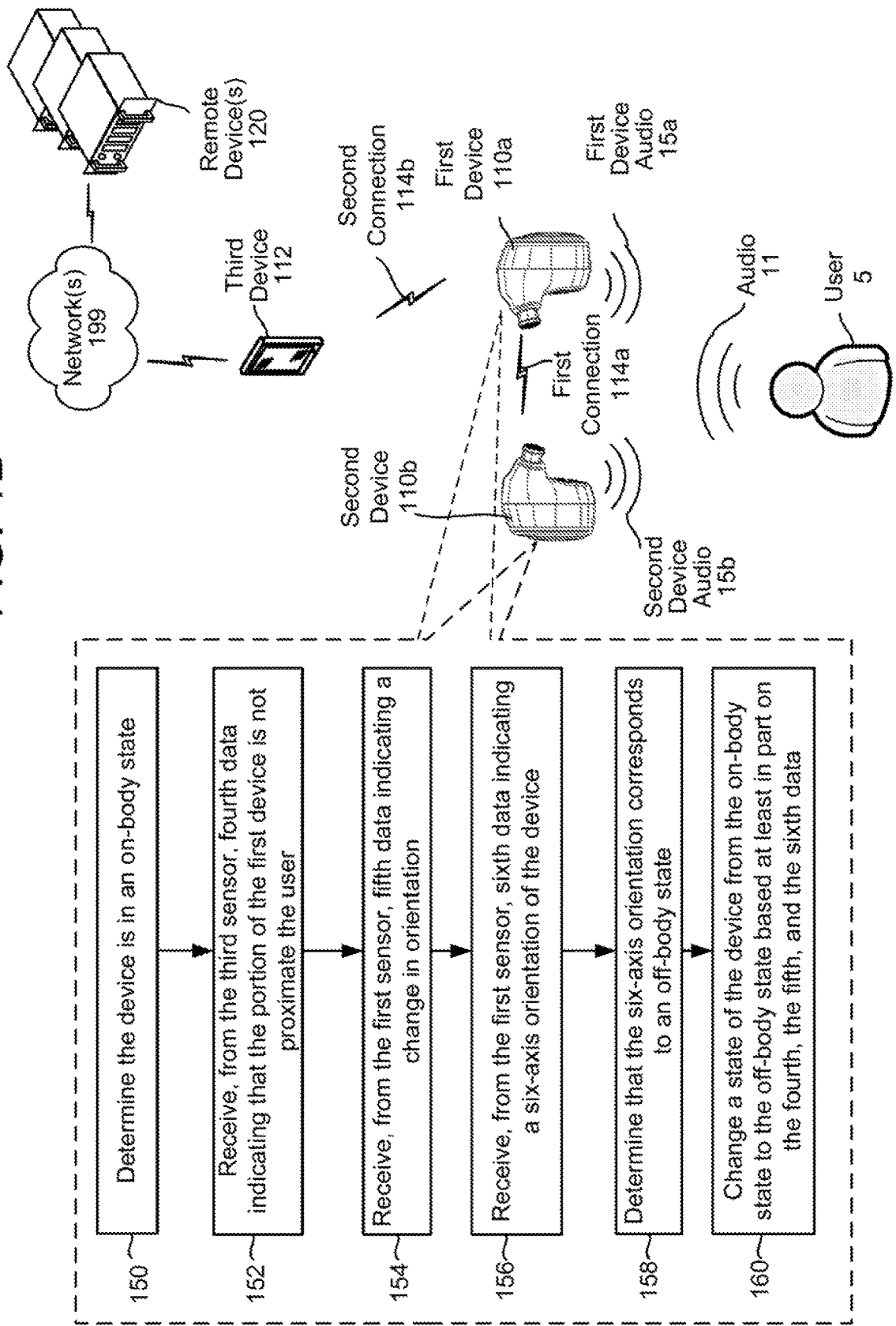

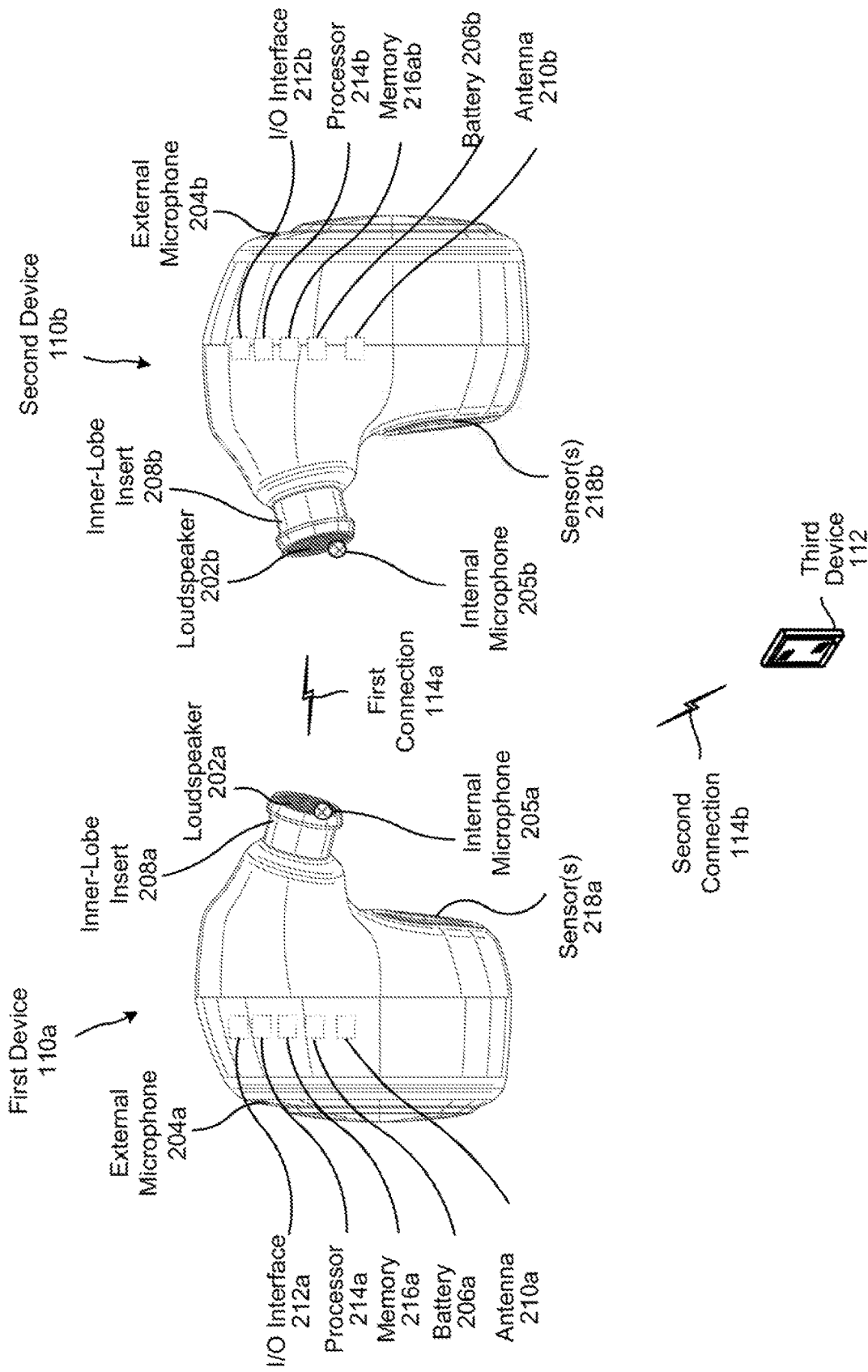

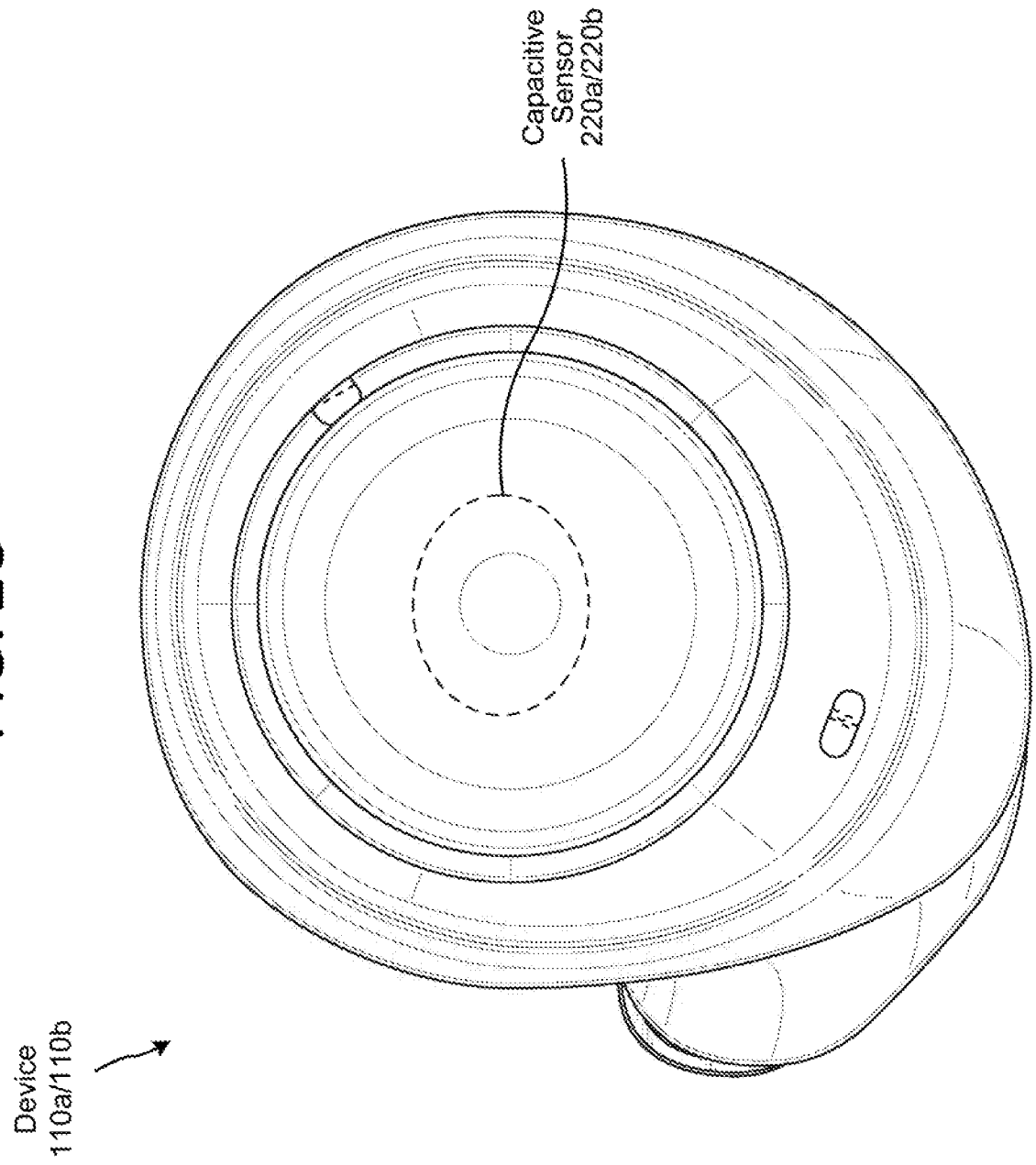

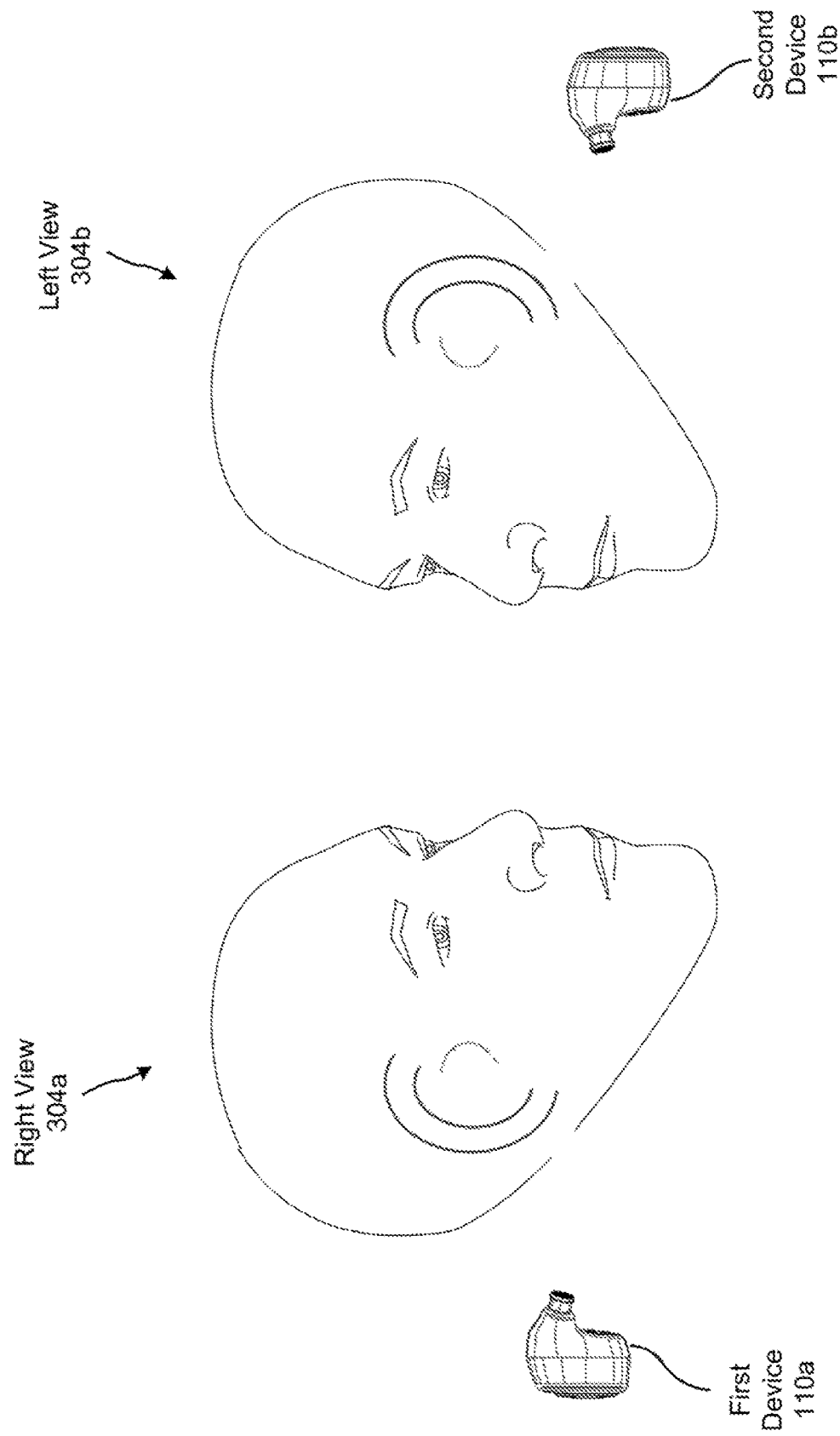

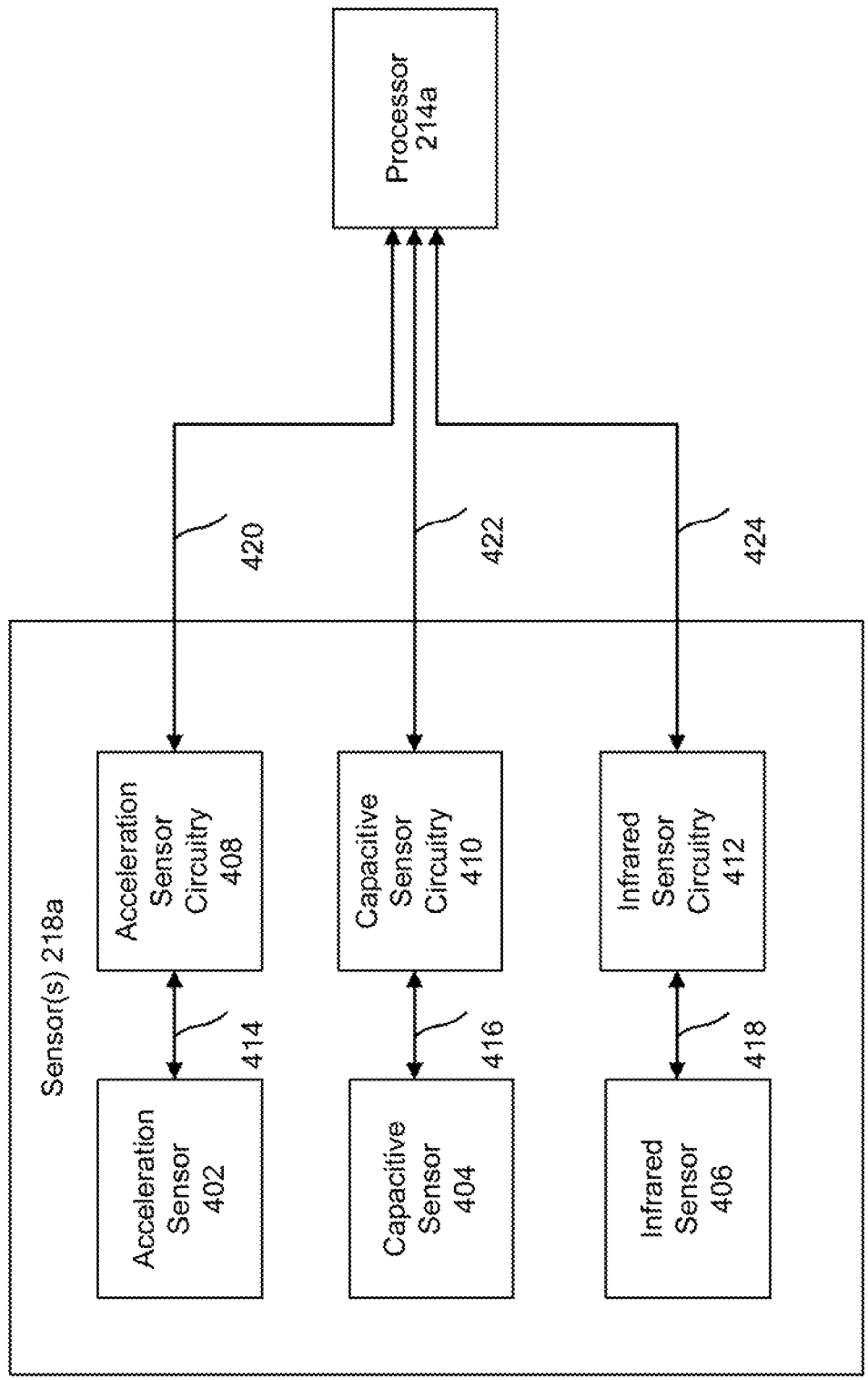

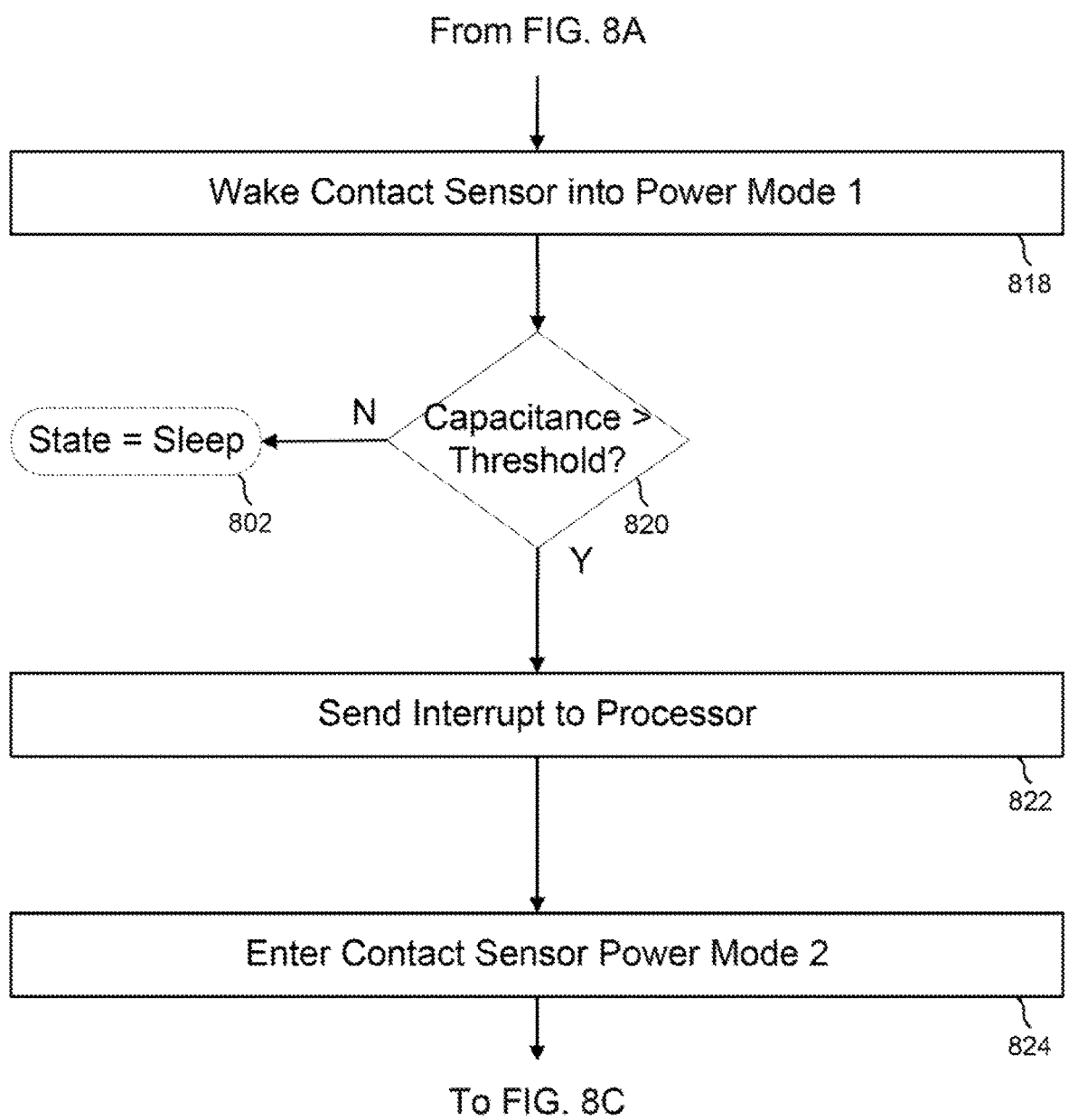

ON-BODY DETECTION OF WEARABLE DEVICES

BACKGROUND

Wireless audio devices, such as earbuds or headphones, may be used to communicate wirelessly with a user device, such as a smartphone, smartwatch, or similar device, and with each other. The wireless earbuds may be used to output audio sent from the user device, such as music, as part of two-way communications, such as telephone calls, and/or to receive audio for speech recognition.

BRIEF DESCRIPTION OF DRAWINGS

For a more complete understanding of the present disclosure, reference is now made to the following description taken in conjunction with the accompanying drawings.

FIG. 1A illustrates a system configured to determine on-body status of a device according to embodiments of the present disclosure.

FIG. 1B illustrates a system configured to determine off-body status of a device according to embodiments of the present disclosure, FIGS. 2A, 2B, 2C, and 2D are diagrams of audio devices according to embodiments of the present disclosure.

FIGS. 3A and 3B are diagrams of audio devices in on-body (e.g., in-ear) and off-body (e.g., out-of-ear) states according to embodiments of the present disclosure.

FIG. 4 is a diagram of sensor components according to embodiments of the present disclosure.

FIGS. 8A, 8B, 8C, and 8D are diagrams of another method for determining in-ear status of an audio device according to embodiments of the present disclosure.

DETAILED DESCRIPTION

Figure 2D:
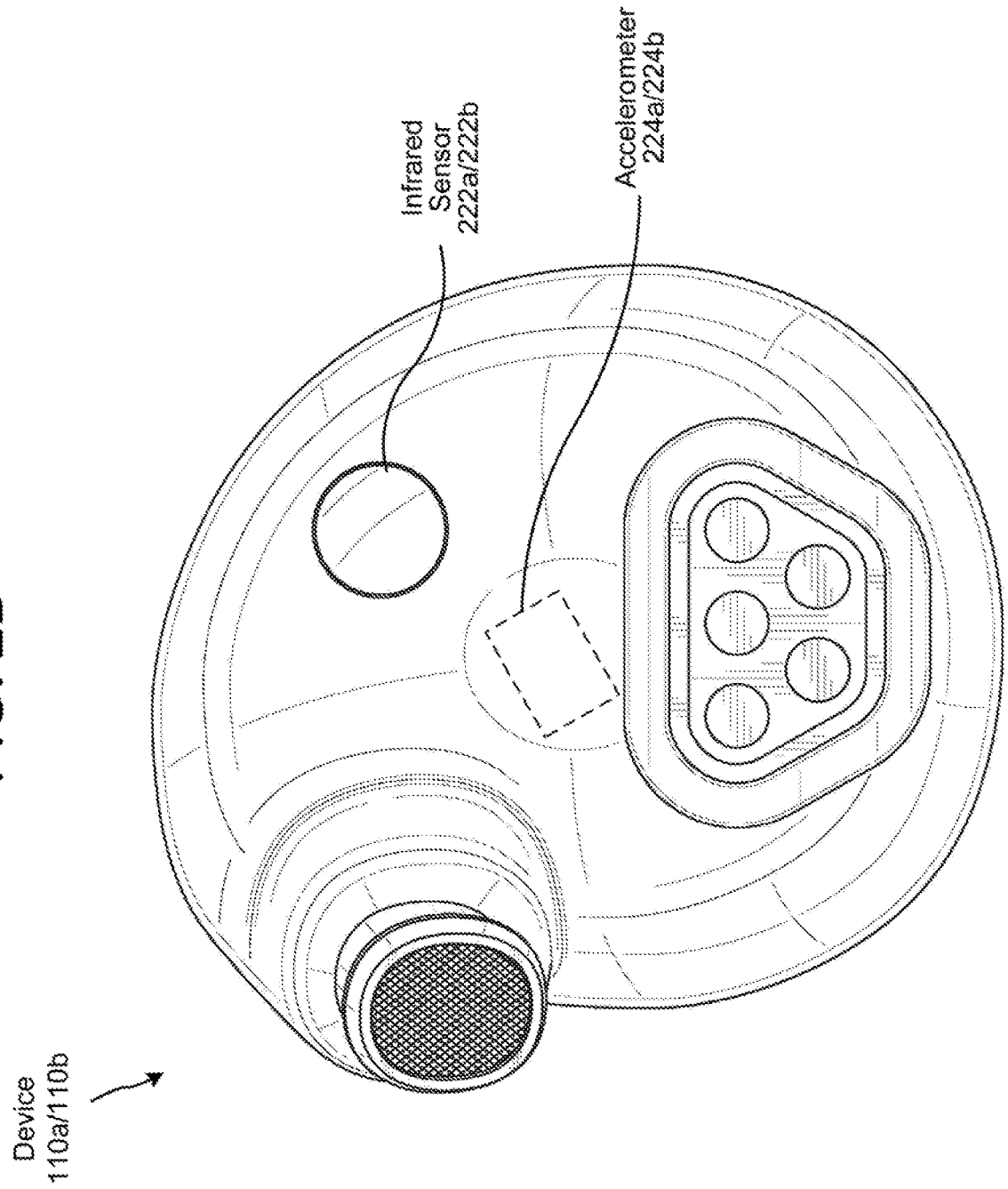

Some electronic devices may include an audio-based input/output interface. A user may interact with such a device—which may be, for example, a smartphone, smart speaker, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. The device may include an audio output device, such as a loudspeaker, for outputting audio that in some embodiments responds to and/or prompts for the voice input.

Use of the above-described electronic device by its audio-based input/output interface may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device and interact with the audio-based input/output interface therewith. As the term is used herein, "headphones" may refer to any hands-free, wearable audio input/output device and includes headsets, earphones, earbuds, or any similar device. For added convenience, the user may choose wireless headphones, which communicate with the device—and optionally each other—via a wireless connection, such as Bluetooth, WI-FI, near-field magnetic induction (NFMI), cellular long-term extension (LTE), or any other type of wireless connection. Wireless earbuds may be more desirable and/or convenient to users because the earbuds do not require a wire or cord connecting them; such a cord may be distracting and/or uncomfortable.

In the present disclosure, for clarity, headphone components that are capable of communication with both a third device and each other are referred to as "wireless earbuds," but the term "earbud" does not limit the present disclosure to any particular type of wired or wireless headphones. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth or NFMI connection); the primary earbud further communicates with a third device (such as a smartphone, smart watch, or similar device) using a second connection (such as a Bluetooth connection). The secondary earbud communicates directly with only with the primary earbud and does not communicate using a dedicated connection directly with the smartphone; communication therewith may pass through the primary earbud via the first wireless connection.

The primary and secondary earbuds may include similar hardware and software; in other instances, the secondary earbud contains different hardware/software included in the primary earbud. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device." The first, second, and/or third devices may communicate over a network, such as the Internet, with one or more server devices, which may be referred to as "remote device(s)."

Each of the primary and secondary earbuds may also include a loudspeaker; the loudspeaker may include a single audio-output device or a plurality of audio-output devices. As the term is used herein, a loudspeaker refers to any audio-output device; in a system of multiple audio-output devices, however, the system as a whole may be referred to as a loudspeaker while the plurality of audio-output devices therein may each be referred to as a "driver."

When an audio device is disposed on the body of a user (e.g., in the ear, on the wrist, or on the face of a user) (i.e., the state or status of the device is on-body), it may have different settings or states as compared to when the audio device is not disposed on the body of the user (e.g., out of the ear of the user, not on the wrist of the user, or not on the face of the user) (i.e., the state or status of the device is off-body). For example, the device may turn on and connect to one or more wireless networks when its status is on-body; when its status is off-body, the audio device may disconnect from one or more wireless networks and/or enter a low-power or "sleep" mode.

Determining when the audio device is on-body or off-body is, however, difficult. Determining the status using a touch sensor, for example, may be prone to false positive detection if the user is merely holding the device in his or her hand and the device is not yet disposed in the ear or on the wrist or face of the user. Determining the status using an orientation sensor may consume an unacceptable amount of power.

Though the present disclosure recites determining the in-ear and out-of-ear status of wireless earbuds, one of skill in the art will understand that the systems and methods described herein may be used with other wearable devices, such as smart watches (i.e., determining the on-wrist or off-wrist status of a smart watch) and smart glasses (i.e., determining the on-face or off-face status of a pair of smart glasses). As one of skill in the art will understand, a smart watch is a device wearable on a wrist of a user that may include a display, processor, memory, microphone, loudspeaker, and/or sensors, and a pair of smart glasses is a device wearable on a face of a user, in a fashion similar to eyeglasses, that may include a display or projector, processor, memory, microphone, loudspeaker, and/or sensors. The present disclosure is thus not limited to only wireless earbuds, smart watches, or smart glasses.

The present disclosure offers a system and method for determining when an audio device is disposed on the body of a user (i.e., the status of the device is on-body) and when the audio device is not disposed on the body of the user (i.e., the status of the device is off-body). In various embodiments, when the device is off-body, its off-body status is determined in a number of steps or stages. A motion sensor, such as an accelerometer, may first be used to determine that the device is in motion. If the acceleration of the device in any of the x, y, or z directions is greater than an acceleration threshold, the system and method proceeds to the next step. A capacitive proximity sensor is turned on and measures an amount of capacitance between itself and a grounded body (i.e., the user's body) in contact with it. If an amount of sensed capacitance is greater than a threshold capacitance, the system and method proceeds to the next step. A light sensor (e.g., and infrared sensor) disposed on the device (in, e.g., an inner-lobe insert of an audio device) determines if an object (e.g., a part of the inner ear of the user) is nearby (e.g., within 7.5-15 mm) by sensing an amount of received infrared light using, e.g., a photodiode. The amount of light detected may be compared to a light threshold. For example, the light may be emitted by a light source disposed nearby on the inner-lobe insert. The photodiode may convert an amount of received light into a voltage; this voltage may increase the closer the inner-lobe insert is to an object (e.g., an inner ear) and may decrease the farther the inner-lobe insert is to the object. A voltage corresponding to a desired distance (e.g., 7.5-15 mm) may be determined through experimentation. If an amount of sensed infrared is greater than an light threshold/infrared threshold (i.e., the voltage is greater than a threshold voltage), the system and method determines that the status is on-body (e.g., in-ear) or optionally proceeds to another next step. In this next step, an orientation sensor determines the orientation of the audio device.

The orientation may include six degrees of orientation, which may include three spatial x, y, z degrees and/or three rotational orientation degrees, such as x, y, z, pitch, yaw, and roll. The orientation sensor may include the accelerometer, a gyroscope, and/or other sensor, and the orientation may be determined from a current status of the sensor and/or a history of prior movement or acceleration determined by the sensor. The audio device may compare the orientation to a range of orientations associated with on-body status and, if the orientation is within the range, determine that the status is in-ear. For example, the first degree of orientation, x1, may be determined to lie within or without a range of values between a lower x-position and a higher x-position; if the degree of orientation x1 is determined to lie within the range of values, and if the other degrees of orientation are similarly determined to lie within corresponding ranges of values, the audio device determines that it status is on-body.

FIG. 1A illustrates a system for determining an on-body status of a first device 110a and/or a second device 110b. The first device 110a, which may be a primary wireless earbud, communicates with the second device 110b, which may be a secondary wireless earbud, using a first wireless connection 114a. The first device 110a may also communicate with a third device 112, which may be a smart phone, using a second wireless connection 114b. The third device 112 may communicate with one or more remote devices 120 over a network 199, which may be or include the Internet. The first device 110a may output first output audio 15a, and the second device 110b may output second output audio 15b; one or both of the devices 110a/110b may receive audio 11 from a user 5.

In various embodiments, a device 110a/110b determines (130) that it is in an off-body (e.g., out-of-ear) state. The device 110a/110b receives (132), from a first sensor, first data and indicating that the device 110a/110b is in motion. Based at least in part on the first data, the device 110a/110b activates (134) a second sensor. The device 110a/110b receives (136), from the second sensor, second data indicating that the device is in contact with a portion of a user's body. Based at least in part on the second data, the device 110a/110b activates (138) a third sensor. The device 110a/110b receives (140), from the third sensor, third data indicating that a portion of the device 110a/110b is disposed proximate the user (e.g., inserted in an ear of the user). Based at least in part on the first data, the second data, and the third data, the device 110a/110b changes (148) a state of the device 110a/110b from the off-body (e.g., out-of-ear) state to an on-body (e.g., in-ear state). As explained further below, the change to the on-body state may trigger other changes to the device 110a/110b, such as changing from a power-off or sleep mode to a power-on mode.

FIG. 1B illustrates a system for determining an off-body status of the first device 110a and/or a second device 110b. The device 110a/110b determines (150) that it is in an on-body state using, for example, the system and method described above. The device 110a/110b receives (152), from the third sensor, fourth data indicating that the portion of the device 110a/110b is not proximate the user. The device 110a/110b receives (154) fifth data indicating a change in orientation of the device 110a/110b. The device 110a/110b (156) receives, from the first sensor, sixth data indicating a six-degree orientation of the device 110a/110b and determines (158) that the six-degree orientation corresponds to an off-body state. The device 110a/110b changes (160) the state of the device from on-body to off body based on the fourth, the fifth, and the sixth data.

FIGS. 2A and 2B illustrate additional features of an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110a/110b may each include a loudspeaker 202a/202b. The loudspeaker 202a/202b may be any type of loudspeaker, such as an electrodynamic loudspeaker, electrostatic loudspeaker, dynamic loudspeaker, diaphragm loudspeaker, or piezoelectric loudspeaker. The loudspeaker 202a/202b may further include one or more drivers, such as balanced-armature drivers or dynamic drivers. The present disclosure is not, however, limited to any particular type of loudspeaker 202a/202b or driver.

The devices 110a/110b may further each include one or more microphones, such as external microphones 204a/204b and/or internal microphones 205a/205b. The microphones 204a/204b and 205a/205b may be any type of microphone, such as a piezoelectric or MEMS microphone. The loudspeakers 202a/202b and microphones 204a/204b and 205a/205b may be mounted on, disposed on, or otherwise connected to the devices 110a/110b. The devices 110a/110b may each further include inner-lobe inserts 208a/208b that may bring the loudspeakers 202a/202b closer to the eardrum of the user and/or block some ambient noise. The internal microphones 205a/205b may be disposed in or on the inner-lobe inserts 208a208b or in or on the loudspeakers 202a/202b. The external microphones 204a/204b may be disposed in or on the devices 110a/110b.

Each device 110a/110b may include one or more batteries 206a/206b. One or more antennas 210a/210b may be used to transmit and/or receive wireless signals over the first connection 114a and/or second connection 114b; an I/O interface 212a/212b contains software and hardware to control the antennas 210a/210b and transmit signals to and from other components. A processor 214a/214b may be used to execute instructions in a memory 216a/216b; the memory 216a/216b may include volatile memory (e.g., random-access memory) and/or non-volatile memory or storage (e.g., flash memory).

The devices 110a/110b may further each include one or more sensors 218a/218b. The sensors 218a/218b may include one or more accelerometers, capacitive-based contact sensors, and infrared-based proximity sensors. Some sensors, such as accelerometers, may consume comparatively little power and may be powered on and sensing data continuously or for long periods of time. Other types of sensors, such as contact sensors and proximity sensors, may consume comparatively more power and may be powered on and sensing data only when needed. The sensors 218a/218b may further include gyroscopes, skin temperature sensors, heart rate monitors, humidity sensors, pressure sensors, and bone-conduction sensors. FIG. 2C illustrates an example placement of the capacitive sensor 220a/220b on a surface of the device 110a/110b. FIG. 2D illustrates an example placement of the infrared sensor 222a/222b and the accelerometer 224a/224b. The present disclosure is not, however, limited to only these placements of the sensors.

Figure 3A:
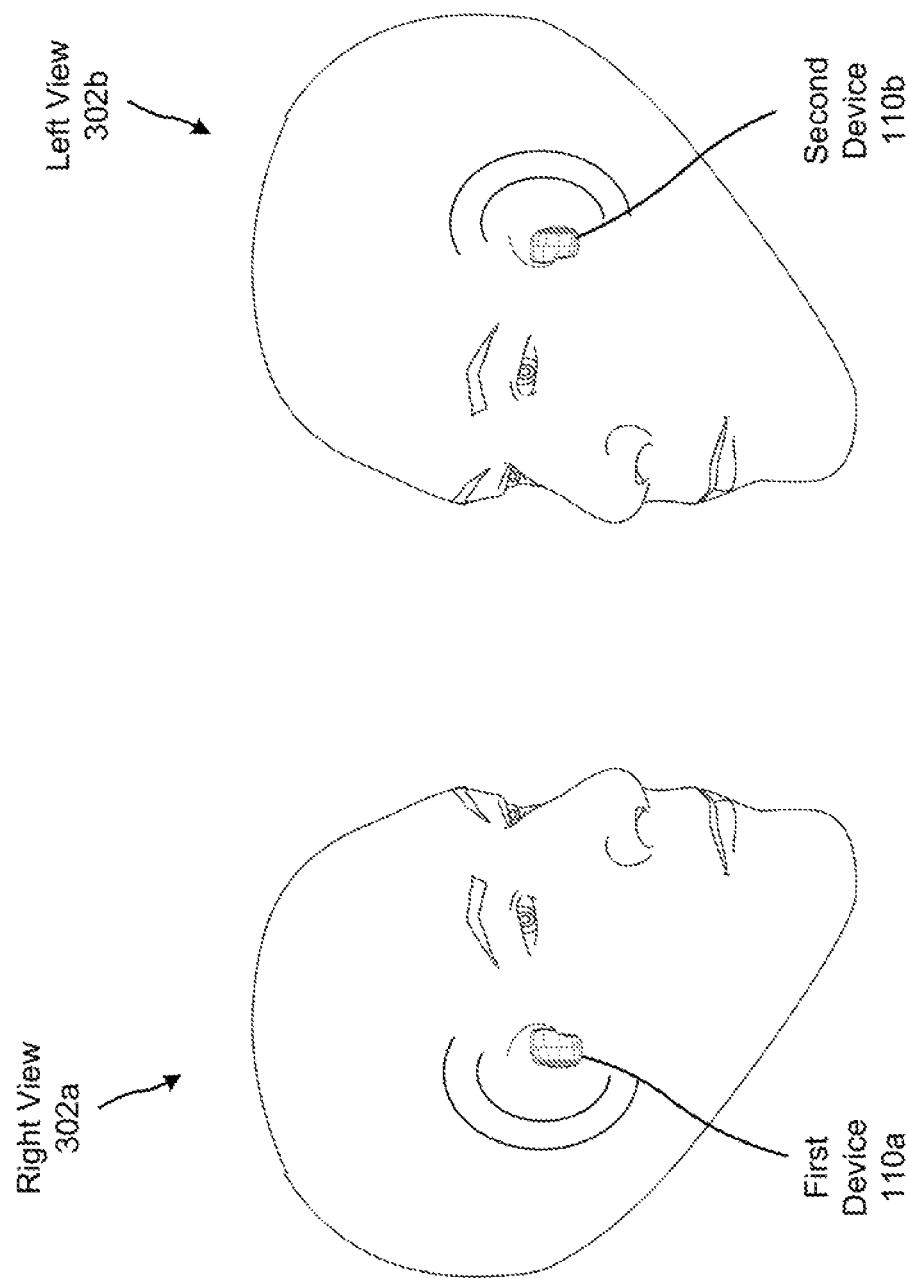

FIG. 3A illustrates a right view 302a and a left view 304b of a user of the first device 110a and the second device 110b; both devices 110a/110b have a state corresponding to an in-ear state. FIG. 3B illustrates a right view 304a and a left view 304b of the user of the first device 110a and the second device 110b; both devices 110a/110b have a state corresponding to an out-of-ear state.

FIG. 4 is a diagram of sensor components according to embodiments of the present disclosure. The devices 110a/110b may include an acceleration sensor 402 (also referred to herein as an accelerometer). The acceleration sensor 402 may be, for example, a microelectromechanical system (MEMS) device and may be capable of determining acceleration in one of three (x, y, z) directions. In some embodiments, the acceleration sensor 402 may also be used as an orientation sensor and may also determine three degrees of rotational disposition. In other embodiments, a separate orientation sensor may be used instead of the acceleration sensor 402.

The devices 110a/110b may also include a capacitive sensor 404, which may also be referred to herein as a contact sensor or a capacitive contact sensor. The capacitive sensor 404 may sense a capacitance between an electrode and a grounded body, such as a human body, in contact with or near the electrode. A high capacitance indicates contact while a low capacitance indicates lack of contact. A capacitance threshold may be used to distinguish between contact and no contact.

The devices 110a/110b may also include an infrared sensor 406, which may also be referred to herein as a proximity sensor or infrared proximity sensor. The infrared sensor 406 may emit infrared light and sense how much is reflected back; if an object is proximate the infrared sensor 406, more light is reflected and sensed than if the object is not proximate. An infrared threshold may be used to distinguish between an object being proximate or not proximate.

The acceleration sensor 402, capacitive sensor 404, and infrared sensor 406 may communicate with respective circuitry 408, 410, and 412 using respective signals 414, 416, 418. The circuitry 408, 410, and 412 may include circuitry for turning each sensor 402, 404, 406 on or off, circuitry for receiving data from each sensor 402, 404, 406, circuitry for comparing the received data to one or more thresholds, circuitry for raising an interrupt with the processor 214a if and when a threshold is crossed, and one or more registers for storing data that the processor 214a may request. The circuitry 408, 410, and 412 may communicate with the processor 214a using respective signals 420, 422, 424. The circuitry 408, 410, and 412 may power on the sensors 402, 404, 406 even when the processor 214a is in a lower-power or sleep mode.

Figure 5:
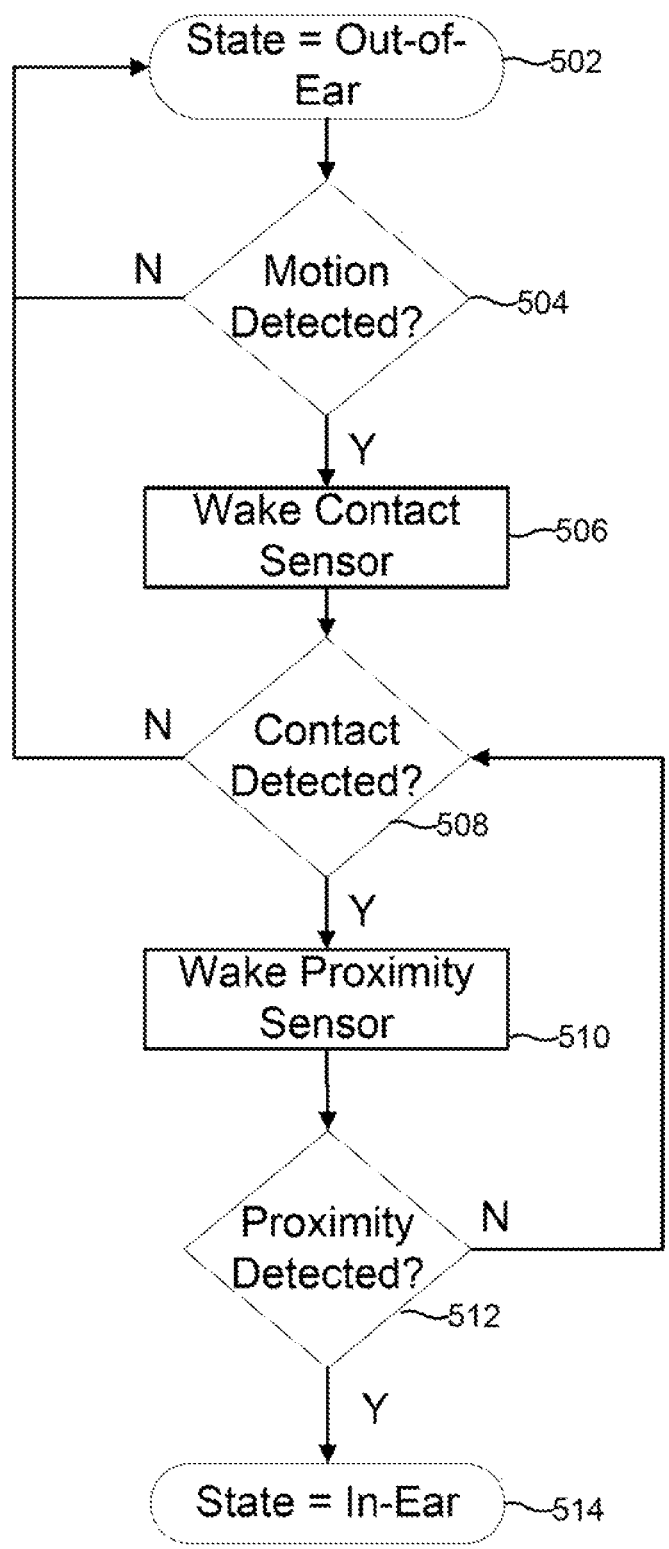
FIG. 5 is a diagram of a method for determining in-ear status of an audio device according to embodiments of the present disclosure.

FIG. 5 is a diagram of a method for determining in-ear status of an audio device according to embodiments of the present disclosure. The method begins by assigning an out-of-ear status (502) to the audio device upon, for example, device start, re-start, or wake from sleep. The acceleration sensor 402 is monitored by the acceleration sensor circuitry 408; the acceleration sensor circuitry 408 receives (x, y, z) acceleration data from the acceleration sensor 402 and compares the (x, y, z) acceleration data to one or more thresholds. A single threshold may be used for each (x, y, z) direction or each (x, y, z) direction may have its one threshold. If a threshold is reached, motion is detected (504). The acceleration sensor circuitry 408 may activate the acceleration sensor 402 continuously or at period intervals.

Once motion is detected, the processor 214a sends (506) a command to the capacitive sensor circuitry 410 to turn on the capacitive sensor 404. The capacitive sensor 404, as mentioned above, sends data regarding a sensed capacitance to the capacitive sensor circuitry 410; the greater the capacitance, the more contact there is with a grounded body. The capacitive sensor 404 determines that contact is detected (508) when the sensed capacitance is greater than a capacitance threshold.

The processor 214a then sends a command to the infrared sensor circuitry 412 to wake (510) the proximity sensor 406. The proximity sensor 406 sends proximity data to the infrared sensor circuitry, which compares the proximity data to a proximity threshold. In some embodiments, the proximity threshold corresponds to proximity of 7.5-15 mm. Once proximity is detected (512), the processor 214a determines that the status of the device 110a/110b is in-ear 514.

Figure 6A:
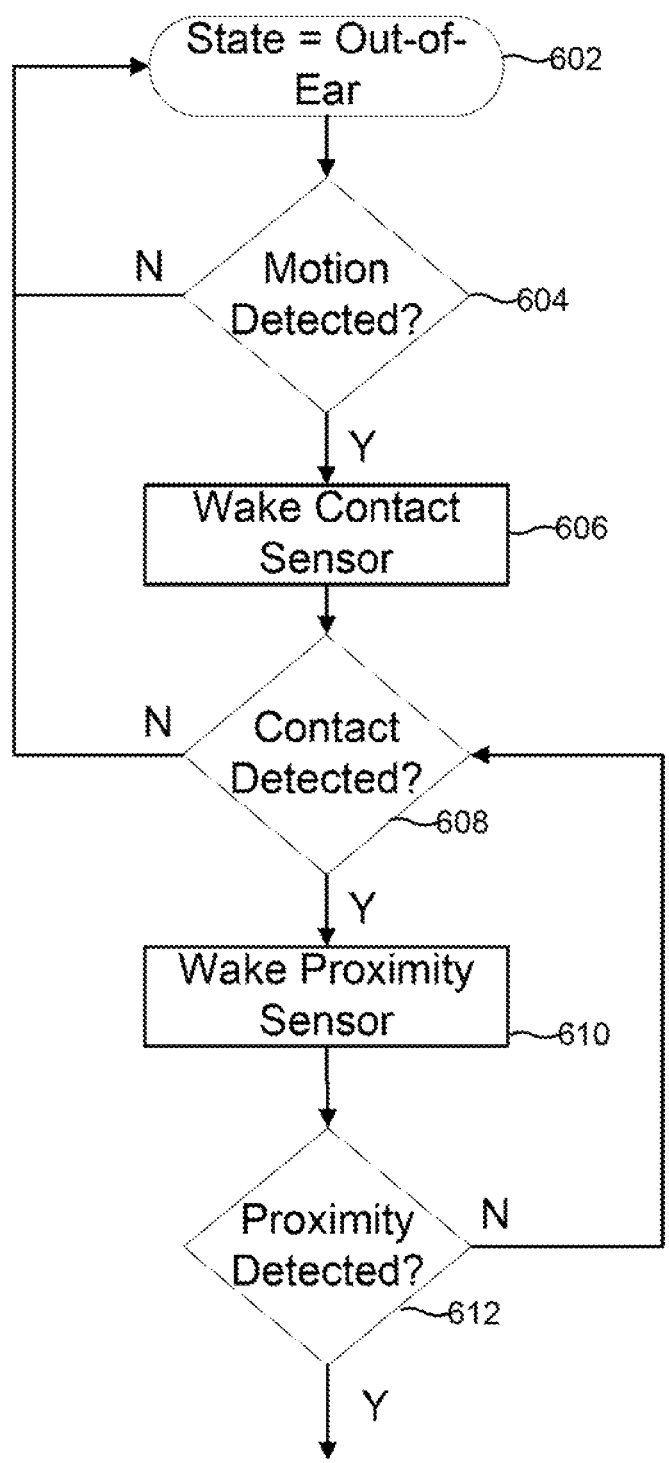
FIGS. 6A and 6B are diagrams of another method for determining in-ear status of an audio device according to embodiments of the present disclosure.
Figure 6B:
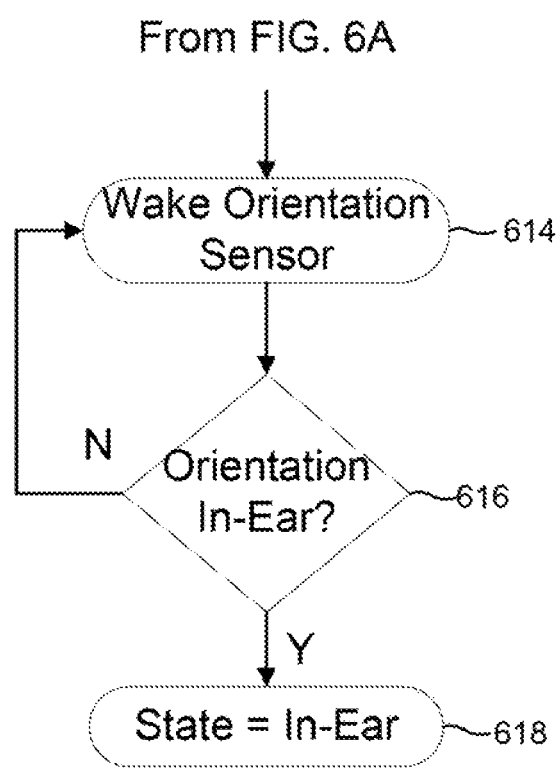

FIGS. 6A and 6B are diagrams of another method for determining in-ear status of an audio device according to embodiments of the present disclosure. Referring also to FIG. 5, the method begins at the out-of-ear status (602). When motion is detected (604), the processor 214a wakes (606) the contact sensor 404. When contact is detected (608), the processor 214a wakes (610) the proximity sensor 408. Once proximity is detected (612), the processor 214a wakes (614) the orientation sensor.

As mentioned above, the orientation sensor may be a separate sensor. In some embodiments, the orientation sensor may be the acceleration sensor 402. The acceleration sensor 402 may operate in three modes; a low-power or sleep mode, an acceleration-sensing mode, and an orientation-sensing mode. In the acceleration-sensing mode, the acceleration sensor 402 may determine (x, y, z) acceleration data; in the orientation-sensing mode, the acceleration sensor may further determine three-dimensional rotation data. The acceleration sensor 402 may send the orientation data to the acceleration sensor circuitry 408, which may in turn send the orientation data to the processor 214a. The processor 214a may compare the orientation data to a range of orientation corresponding to an in-ear status; the range may correspond to orientations associated with the device 110a/110b being disposed in the ear. If the processor 214a determines (616) that the orientation corresponds to an in-ear orientation, the processor 214a determines (618) that the device 110a/110b is in-ear.

Figure 7A:
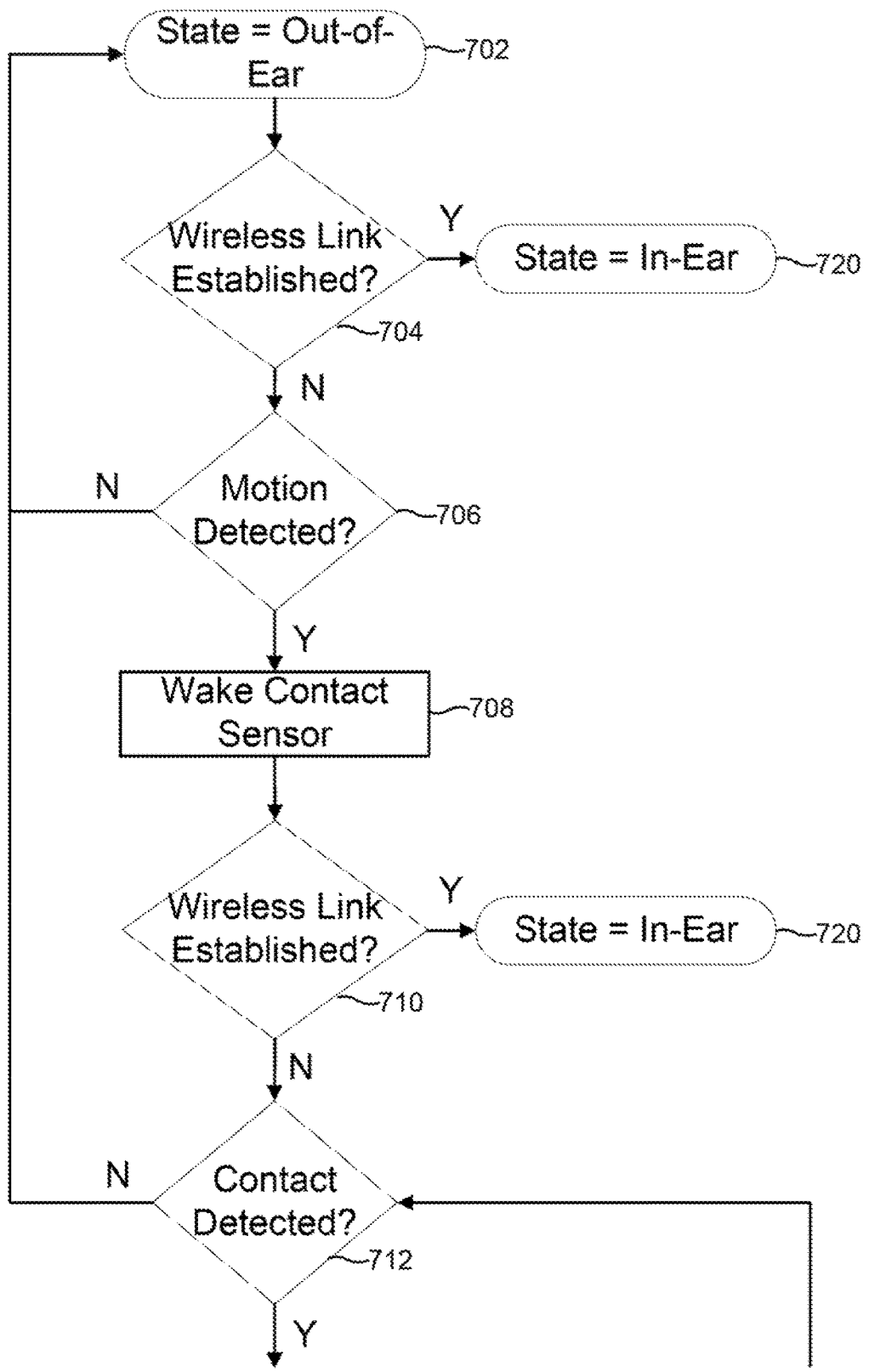
FIGS. 7A and 7B are diagrams of another method for determining in-ear status of an audio device according to embodiments of the present disclosure.
Figure 7B:
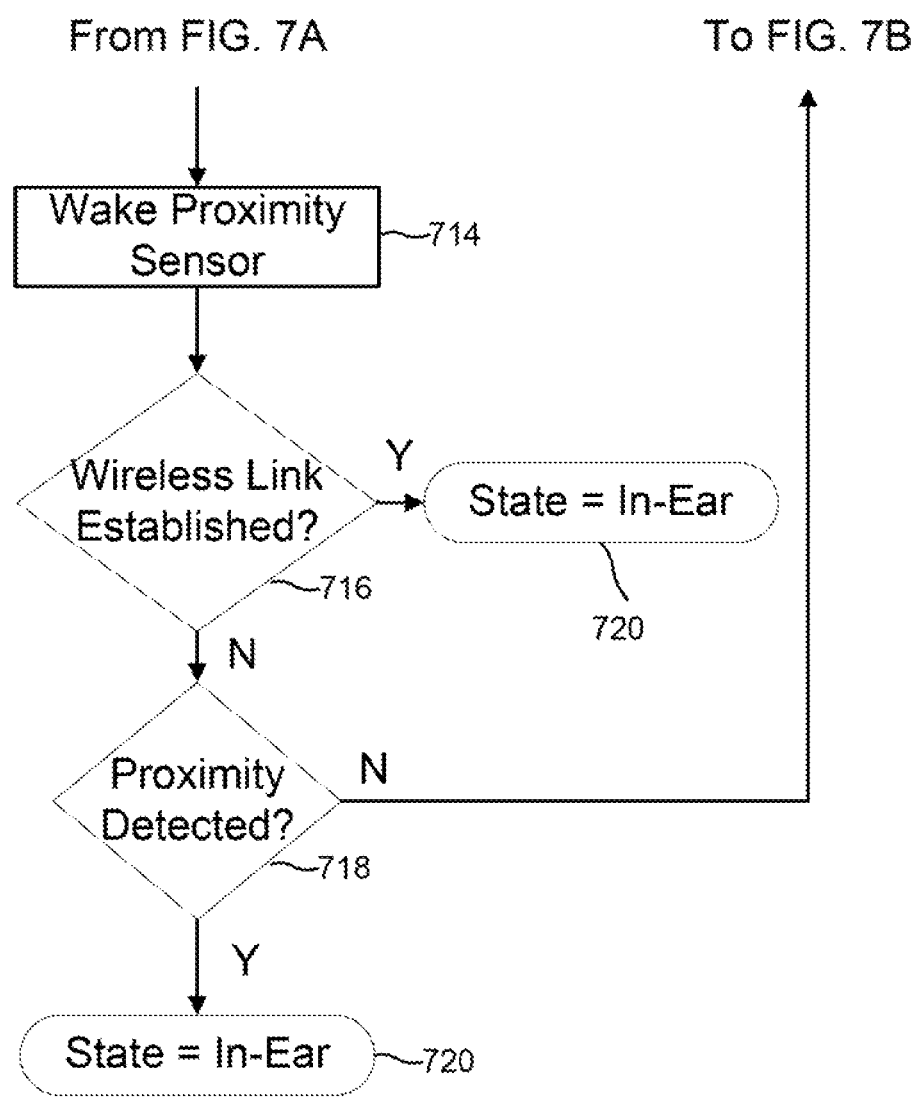
Figure 8A:
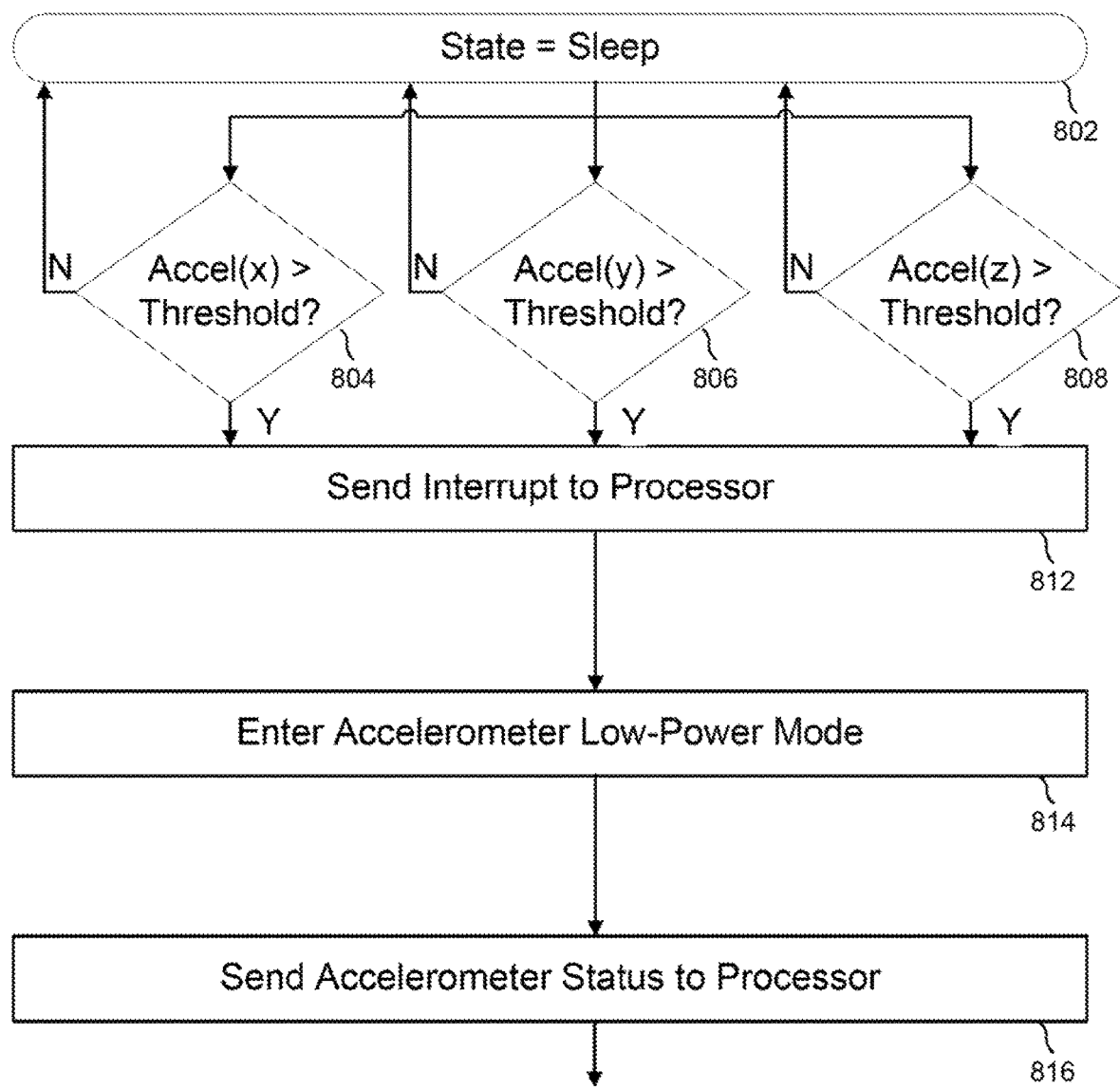
Figure 8C:
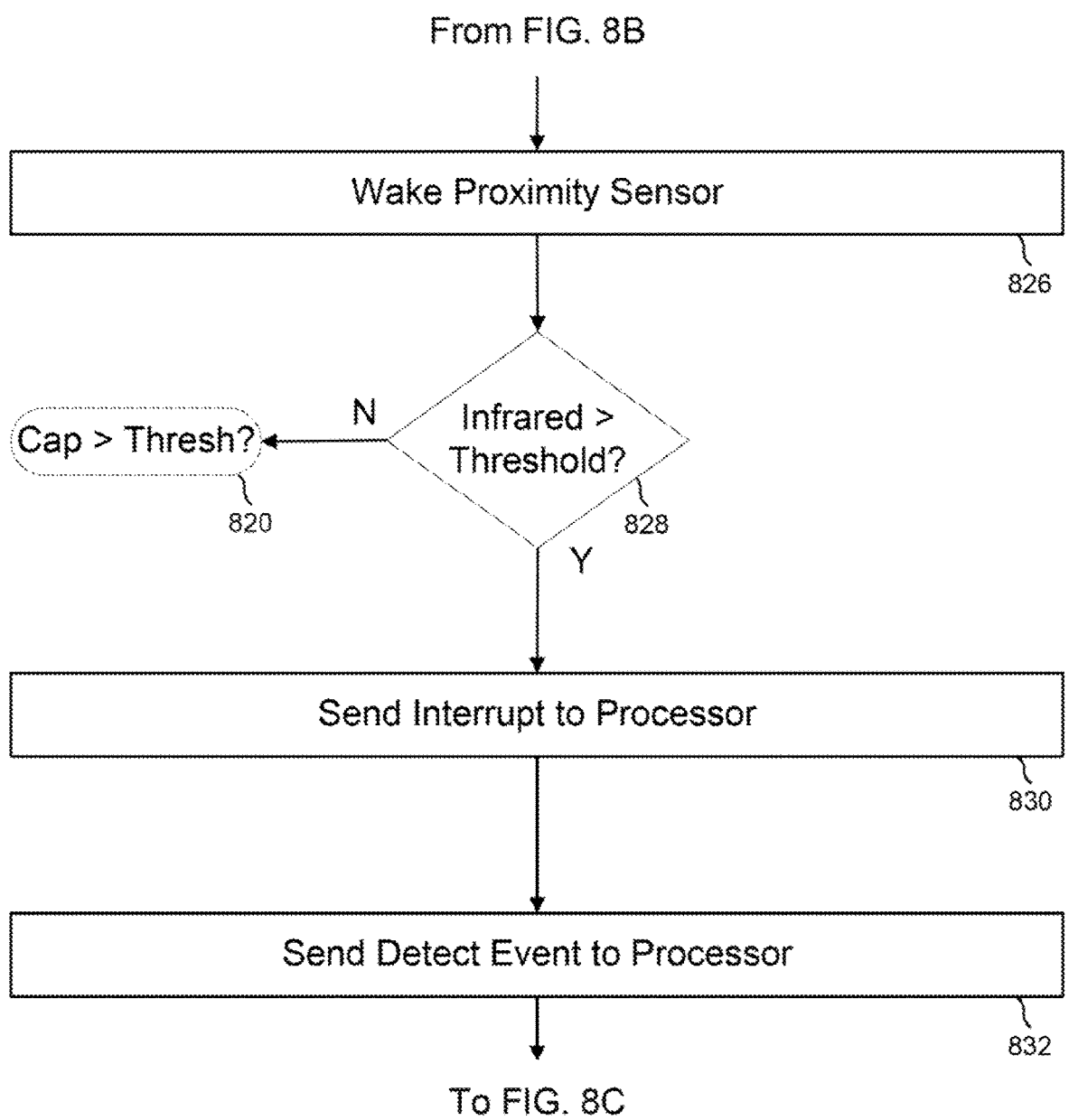
Figure 8D:
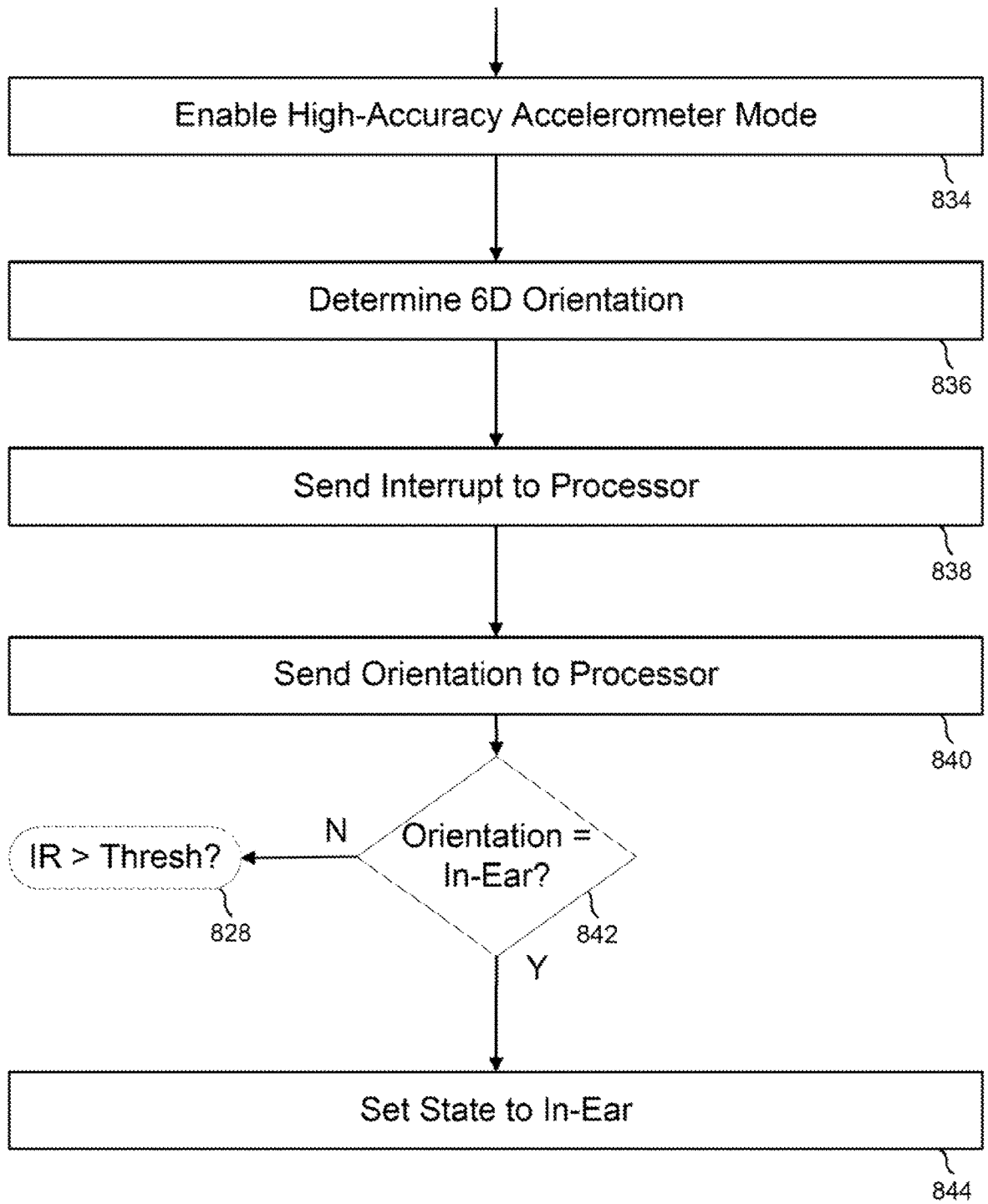

FIGS. 7A and 7B are diagrams of another method for determining in-ear status of an audio device according to embodiments of the present disclosure. Referring also to FIGS. 5, 6A, and 6B, the method begins at the out-of-ear status (702). In some embodiments, as explained below, the method further includes checking for a wireless (e.g., NFMI) connection between the first device 110a and the second device 110b. Because the wireless connection may be established only when the devices are not in sleep mode and disposed proximate each other, the method assigns the in-ear status to the devices when the wireless link is established.

Thus, if the wireless link is established (704) after the devices 110a/110b are in the out-of-ear state (702), the processor 214a assigns (720) the in-ear status to the devices 110a/110b. If the wireless link is not established, as described above, the acceleration sensor 402 collects acceleration data; when the acceleration sensor circuitry 408 determines that motion is detected (706), the processor 214a wakes (708) the contact sensor 404. If the wireless connection is then established (710), the processor 216a assigns the in-ear status (720). If not, the processor 214a determines (712) that contact is detected when the contact sensor 404 senses contact greater than the contact threshold and wakes (714) the proximity sensor 408. Again, if the wireless connection is established (716) at this point, the processor 214a assigns the in-ear status (720). When proximity is detected (718), the processor 214a assigns the in-ear status (720).

FIGS. 8A-8D are diagrams of another method for determining in-ear status of an audio device according to embodiments of the present disclosure. The devices 110a/110b begin in a sleep state (802), which may correspond to the out-of-ear status. The acceleration sensor 402 may sense acceleration greater than an acceleration threshold in an x-direction (804), a y-direction (806), and/or a z-direction (808). Once acceleration in one of the directions is determined, the acceleration sensor circuitry 408 sends (8102) an interrupt to the processor 214a, which may be in a sleep state. The acceleration sensor 402 enters (814) a low-power mode and sends (816) its status to the processor 214a in response to a request from the processor 214a.

The contact sensor 404 wakes (818) into a first power mode, which may be a low-power or "doze" mode in which the contact sensor 404 collects contact data at a first, lower resolution. If the contact sensor circuitry 410 determines (820) that the contact sensor 404 has sensed contact below a contact threshold, the processor 214a determines that the status of the devices 110a/110b is out-of-ear, and the devices 110a/110b enter a low-power or sleep state. If the contact sensor circuitry 410 determines (820) that the contact sensor 404 has sensed contact above a contact threshold, the contact sensor circuitry 410 sends (822) an interrupt to the processor 214a and enters (824) a second power mode; the second power mode in which the contact sensor 404 collects data at a second, higher resolution.

The processor 214a wakes (826) the proximity sensor 406. If the proximity sensor circuitry 412 determines (828) that the proximity sensor 406 has sensed infrared below an infrared threshold, the method returns to the step (820) of checking for detection of the contact threshold. If the proximity sensor circuitry 412 determines (828) that the proximity sensor 406 has sensed infrared above an infrared threshold, the proximity sensor circuitry 412 sends (830) an interrupt to the processor 214a and sends (832) a detect event—e.g., an indication of the detection and/or infrared data corresponding to the detection—to the processor 214a.

The processor 214a enables (834) a high-accuracy mode of the acceleration sensor 402 corresponding to collection of orientation data that includes both position and rotational information. The acceleration sensor 402 determines (836) the six-dimensional orientation of the device 110a/110b and the acceleration sensor circuitry 408 sends (838) an interrupt to the processor 214a and sends (840) the orientation data to the processor 214a. If the processor 214a determines (842) that the orientation data corresponds to an out-of-ear orientation, the method returns to the step of determining 828 if the infrared data is greater than a threshold. If the processor 214a determines (842) that the orientation data corresponds to an in-ear orientation, the processor 214a determines (844) that the status of the device 110a/110b is in-ear.

Figure 9:
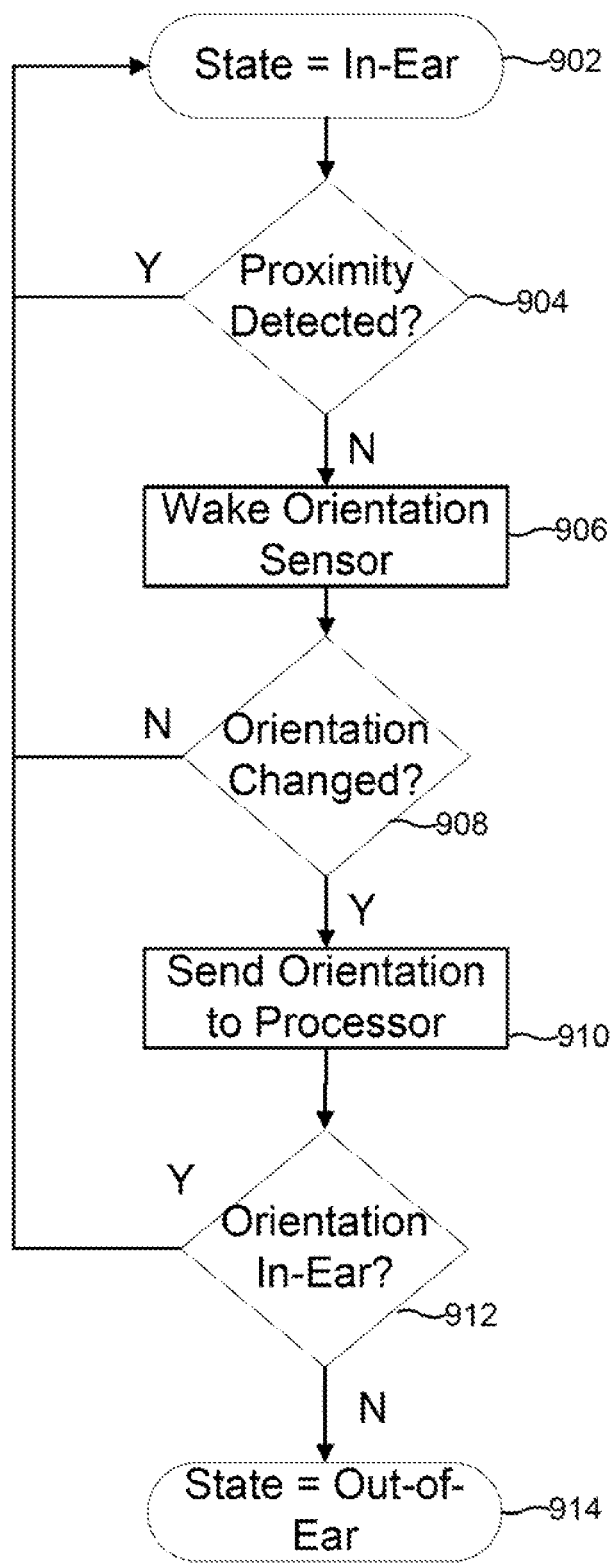
FIG. 9 is a diagram of a method for determining out-of-ear status of an audio device according to embodiments of the present disclosure.

FIG. 9 is a diagram of a method for determining out-of-ear status of an audio device according to embodiments of the present disclosure. The device 110a/110b begins in the in-ear state (902), as described above. If the processor 214a determines (904) that proximity is detected, the processor 214a maintains the in-ear status of the device 110a/110b. If the processor 214a determines (904) that proximity not is detected, the processor 214a wakes (906) the orientation sensor 402. Detection of the proximity may correspond to a different threshold than the threshold used in determining the in-ear status; in some embodiments, the threshold for proximity for determining out-of-ear status is 10-20 mm.

If the orientation sensor 402 and the orientation sensor circuitry 408 determine (908) that the orientation of the device 110a/110b has changed, the orientation sensor circuitry 408 sends (910) the updated orientation data to the processor 214a. If the processor 214a determines (91)2 that the updated orientation data corresponds to an in-ear orientation, the processor 214a maintains the in-ear status 902. If the processor 214a determines (912) that the updated orientation data corresponds to an out-of-ear orientation, the processor 214a sets (914) the status of the device 110a/110b to out-of-ear. Like detection of the wireless network during determining of the in-ear status, if disconnection of the wireless network is determined during any point of the method of FIG. 9, the processor 214a may assign the out-of-ear status to the device 110a/110b based thereon.

Figure 10:
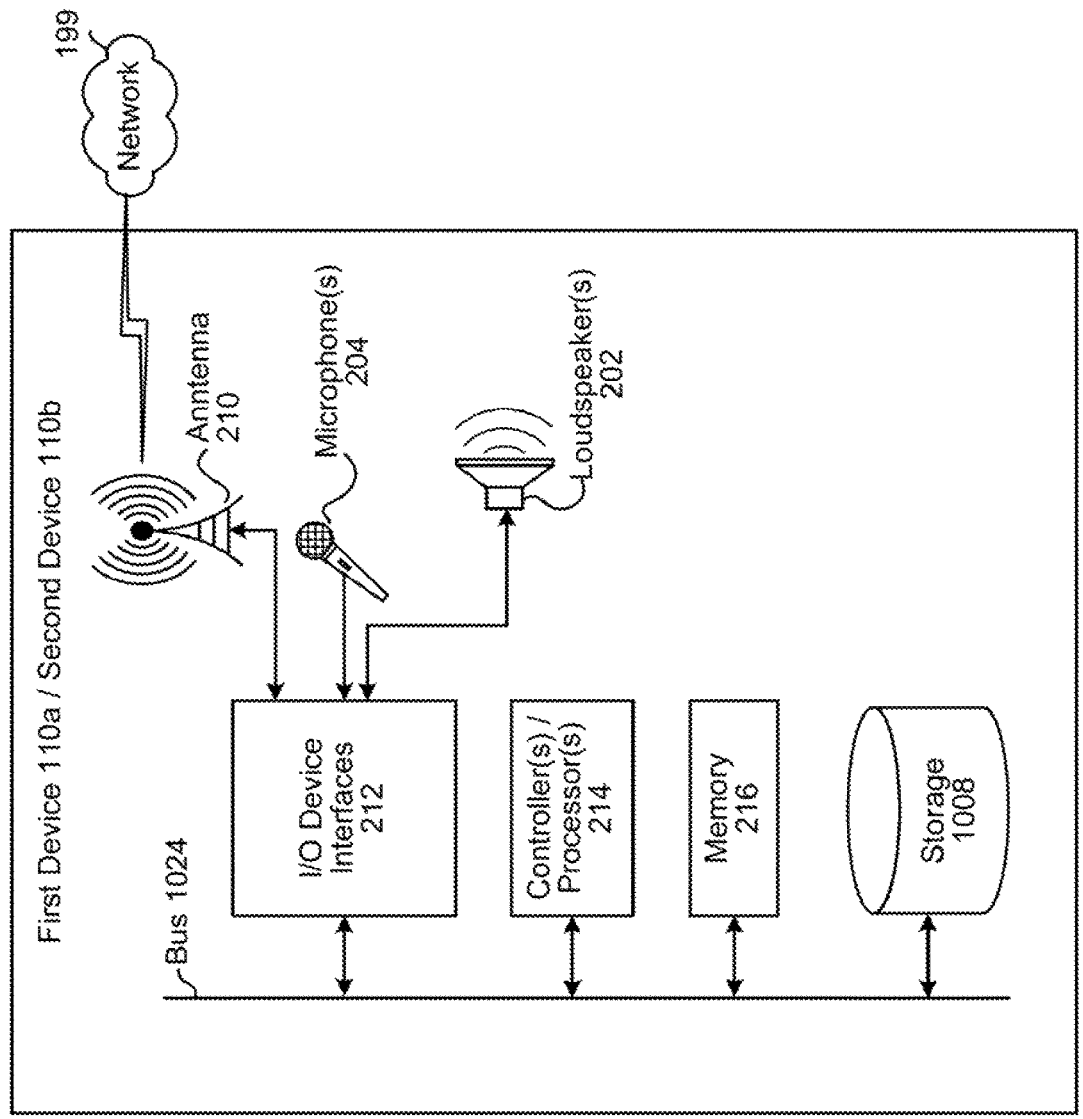
FIG. 10 is a block diagram conceptually illustrating example audio devices according to embodiments of the present disclosure.

FIG. 10 is a block diagram conceptually illustrating a first device 110a or second device 110b that may be used with the described system. Each of these devices 110a/110b may include one or more controllers/processors 214, which may each include a central processing unit (CPU) for processing data and computer-readable instructions and a memory 216 for storing data and instructions of the respective device. The memories 2 may individually include volatile random-access memory (RAM), non-volatile read-only memory (ROM), non-volatile magnetoresistive (MRAM) memory, and/or other types of memory. Each device may also include a data-storage component 1008 for storing data and controller/processor-executable instructions. Each data-storage component 1008 may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 2312.

Computer instructions for operating each device 110a/110b and its various components may be executed by the respective device's controller(s)/processor(s) 214, using the memory 216 as temporary "working" storage at runtime. A device's computer instructions may be stored in a non-transitory manner in non-volatile memory 216, storage 1008, or an external device(s). Alternatively, some or all of the executable instructions may be embedded in hardware or firmware on the respective device in addition to or instead of software.

Each device 110a/110b includes input/output device interfaces 212. A variety of components may be connected through the input/output device interfaces, as will be discussed further below. Additionally, each device 110a/110b may include an address/data bus 1024 for conveying data among components of the respective device. Each component within a device 110a/110b may also be directly connected to other components in addition to (or instead of) being connected to other components across the bus 1024.

For example, via the antenna 210, the input/output device interfaces 212 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to the device 110a/110b/112 of FIGS. 8 and 9, the device 110a/110b/112 may also include input/output device interfaces 31/902 that connect to a variety of components, such as an audio output component like a speaker 302/960 or other component capable of outputting audio. The device 110a/110b/112 may also include an audio capture component which may be, for example, a microphone 204/205 or array of microphones. The microphone 204/205 may be configured to capture audio. The microphones 204/205 may be used to determine an approximate distance to a sound's point of origin; acoustic localization, based on time and/or amplitude differences between sounds captured by different microphones of the array, i.e., beam forming, may be performed. The device 110a/110b (using microphone 204/205, wakeword detection, automatic speech recognition, etc.) may be configured to determine audio data corresponding to detected audio. The device 110a/110b (using input/output device interfaces 212, antenna 210, etc.) may also be configured to transmit the audio data to a remote device 120 for further processing or to process the data using internal components such as a wakeword detection module 229. As a way of indicating to a user that a wireless connection to another device has been created, the device 110a/110b may be configured with a visual indicator, such as an LED or similar component (not illustrated), that may change color, flash, or otherwise provide visual indications by the device 110a/110b.

Figure 11:
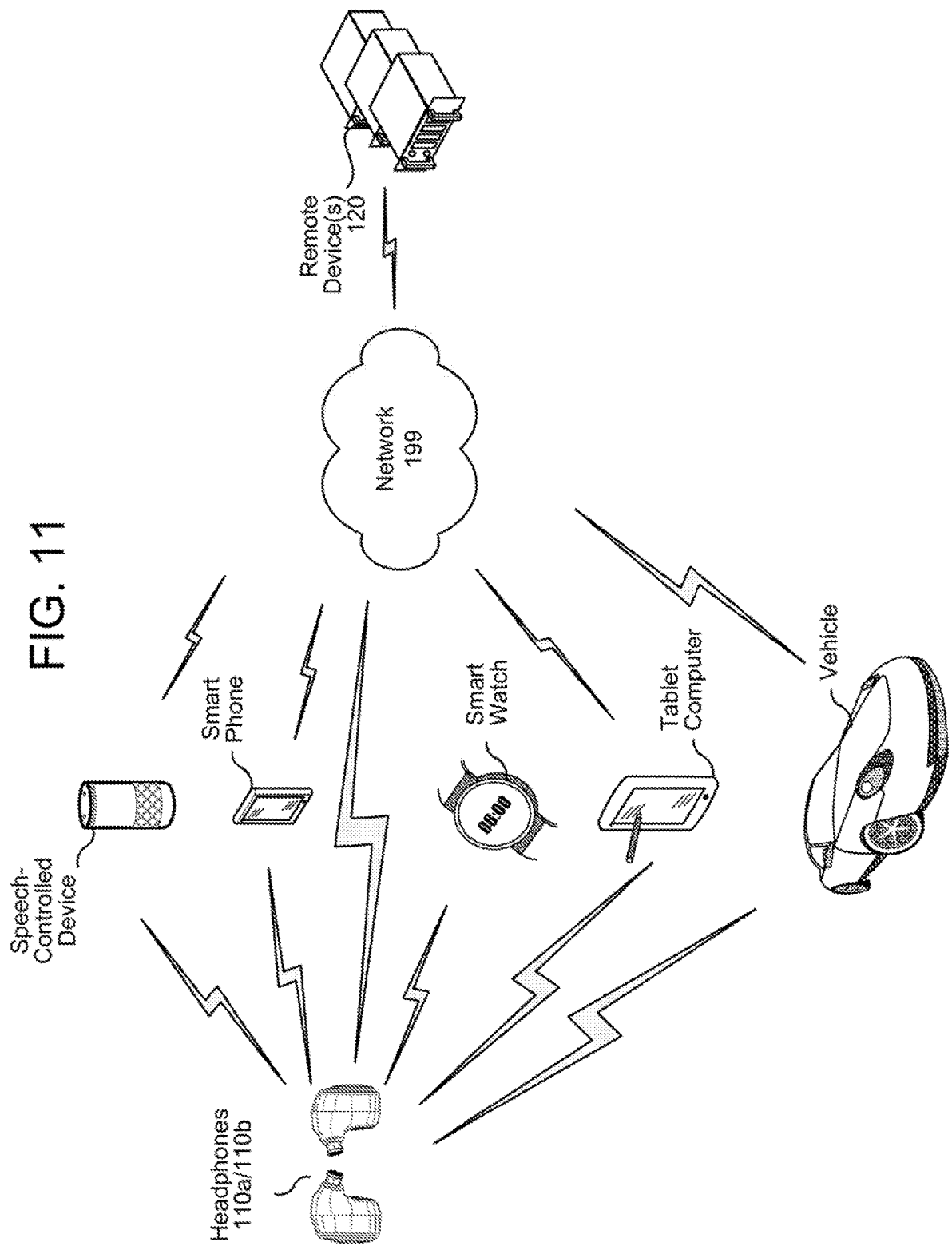
FIG. 11 illustrates an example of a computer network for use with the audio device.

As illustrated in FIG. 11 multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Headphones 110a/110b may similarly be connected to the remote device(s) 120 either directly or via a network connection to one or more of the local devices.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first sensor of a first device, first data indicating that the first device is in motion;
based at least in part on the first data, activating a second sensor of the first device;
receiving, from the second sensor, second data indicating that the first device is in contact with a portion of a user's body;
based at least in part on the second data, activating a third sensor of the first device;
receiving, from the third sensor, third data indicating that a portion of the first device is disposed proximate to the user; and
changing a state of the first device from an off-body state to an on-body state based at least in part on the first data, the second data, and the third data.

2. The computer-implemented method of claim 1, further comprising:
receiving, from the first sensor, fourth data indicating a first orientation of the first device;
subsequent to the first device being in the on-body state, receiving, from the third sensor, fifth data indicating that the portion of the first device is not proximate the user;
receiving, from the first sensor, sixth data indicating a second orientation of the first device different from the first orientation; and
changing the state of the first device from the on-body state to the off-body state based on the fifth data and the sixth data.

3. The computer-implemented method of claim 2, further comprising:
determining that the third data corresponds to a first distance less than a first distance threshold; and
determining that the fifth data corresponds to a second distance greater than a second distance threshold,
wherein the first distance threshold is less than the second distance threshold.

4. The computer-implemented method of claim 1, further comprising:
detecting a short range wireless connection between the first device and a second device worn by the user,
wherein changing the state of the first device from the off-body state to the on-body state is further determined based on the detecting.

5. The computer-implemented method of claim 4, further comprising:
detecting that the short range wireless connection is terminated; and
changing the state of the first device from the on-body state to the off-body state.

6. The computer-implemented method of claim 1, further comprising:
subsequent to the first device being in the on-body state, receiving, from the first sensor, fourth data indicating a pitch of the first device, a yaw of the first device, and a roll of the first device; and
storing the fourth data.

7. The computer-implemented method of claim 6, further comprising:
after storing the fourth data, receiving, from the first sensor, fifth data indicating a second yaw of the first device, a second pitch of the first device, and a second roll of the first device;
determining that a difference between the fourth data and the fifth is greater than a threshold difference; and
based at least in part on determining that the difference is greater than the threshold difference, changing the state of the first device from the on-body state to the off-body state.

8. The computer-implemented method of claim 1, wherein the first device is an earbud, and wherein the third data further indicates that the portion of the first device is disposed proximate the user's ear.

9. The computer-implemented method of claim 1, wherein:
the first sensor comprises an accelerometer,
the second sensor comprises a capacitive touch sensor, and
the third sensor comprises an infrared proximity sensor.

10. A system comprising:
at least one processor; and
at least one memory including instructions that, when executed by the at least one processor, cause the system to:
determine that a first device in in an off-body state;
receive, from a first sensor of the first device, first data indicating that the first device is in motion;
based at least in part on the first data, activate a second sensor of the first device;

receive, from the second sensor, second data indicating that the first device is in contact with a user's body;

based at least in part on the second data, activating a third sensor of the first device;

receive, from the third sensor, third data indicating that a portion of the first device is disposed proximate to the user; and change a state of the first device from the off-body state to an on-body state based at least in part on the first data, the second data, and the third data.

11. The system of claim 10, wherein the at least one memory further comprises instructions that, when executed by the at least one processor, further cause the system to:

receive, from the first sensor, fourth data indicating a first orientation of the first device;

subsequent to the first device being in the on-body state, receive, from the third sensor, fifth data indicating that the portion of the first device is not proximate the user;

receive, from the first sensor, sixth data indicating a second orientation of the first device different from the first orientation; and change the state of the first device from the on-body state to the off-body state based on the fifth data and the sixth data.

12. The system of claim 11, wherein the at least one memory further comprises instructions that, when executed by the at least one processor, further cause the system to:

determine that the third data corresponds to a first distance less than a first proximity distance; and determine that the fifth data corresponds to a second distance greater than a second distance threshold, wherein the first distance threshold is less than the second distance threshold.

13. The system of claim 10, wherein the at least one memory further comprises instructions that, when executed by the at least one processor, further cause the system to:

detect a short range wireless connection between the first device and a second device, wherein changing the state of the first device from the off-body state to the on-body state is further determined based on the detecting.

14. The system of claim 13, wherein the at least one memory further comprises instructions that, when executed by the at least one processor, further cause the system to:

detect that the short range wireless connection is terminated; and change the state of the first device from the on-body state to the off-body state.

15. The system of claim 10, wherein the at least one memory further comprises instructions that, when executed by the at least one processor, further cause the system to:

subsequent to the first device being in the on-body state, receive, from the first sensor, fourth data indicating a pitch of the first device, a yaw of the first device, and a roll of the first device; and store the fourth data.

16. The system of claim 15, wherein the at least one memory further comprises instructions that, when executed by the at least one processor, further cause the system to:

after storing the fourth data, receive, from the first sensor, fifth data indicating a second yaw of the first device, a second pitch of the first device, and a second roll of the first device;

determine that a difference between the fourth data and the fifth data is greater than a threshold difference; and based at least in part on determining that the difference is greater than the threshold difference, change the state of the first device from the on-body state to the off-body state.

17. The system of claim 10, wherein the first device is an earbud, and wherein the third data further indicates that the portion of the first device is disposed proximate the user's ear.

18. The system of claim 10, wherein:

the first sensor comprises an accelerometer, the second sensor comprises a capacitive touch sensor, and the third sensor comprises an infrared proximity sensor.

19. The computer-implemented method of claim 8, wherein at least one of the first sensor, second sensor or third sensor is located in an inner-lobe insert of the earbud.

20. The system of claim 17, wherein at least one of the first sensor, second sensor or third sensor is located in an inner-lobe insert of the earbud.

* * * * *